United States Patent [19]
Beshah

[11] Patent Number: 5,794,565
[45] Date of Patent: Aug. 18, 1998

[54] PET FEEDING STATION

[76] Inventor: Paul T. Beshah, 7719 22nd St., Luois Park, Minn. 55426

[21] Appl. No.: 877,653

[22] Filed: Jun. 17, 1997

[51] Int. Cl.$^6$ .................................................. A01K 5/01
[52] U.S. Cl. ................................................ 119/61; 119/900
[58] Field of Search ........................ 119/61, 62, 900

[56] References Cited

U.S. PATENT DOCUMENTS

| | | |
|---|---|---|
| D. 270,672 | 9/1983 | Zelinger . |
| D. 289,570 | 4/1987 | Hageney . |
| 648,953 | 5/1900 | Hanson ........................ 119/62 |
| 3,121,419 | 2/1964 | Gillespie ...................... 119/61 |
| 3,176,656 | 4/1965 | Bates ............................ 119/62 |
| 5,105,769 | 4/1992 | Smith et al. ................ 119/61 |
| 5,133,291 | 7/1992 | Justice . |
| 5,269,258 | 12/1993 | Brown .......................... 119/61 |
| 5,485,806 | 1/1996 | Watanabe . |
| 5,560,315 | 10/1996 | Lampe .......................... 119/61 |
| 5,560,316 | 10/1996 | Lillelund et al. . |
| 5,649,499 | 7/1997 | Krirtzman et al. .......... 119/62 |

*Primary Examiner*—Paul J. Hirsch
*Attorney, Agent, or Firm*—Janet Peyton Schafer

[57] ABSTRACT

A pet feeding station comprising a generally rectangular tray with a horizontal mount having a recess to receive and support at least one dish for containing water or pet food. The horizontal mount is provided with openings or perforations which allow spillage from the individual dishes to collect in the tray. Additionally, the horizontal mount pivots to an out of the way position for cleaning and retrieving for re-use particulate pet food. In this way, the tray can be kept clear of spillage, while allowing the water to be collected for disposal and the particulate food matter to be collected for re-use. A pair of trays, each with a horizontal mount for receiving and supporting a dish to provide food and water to the pet, is preferred and also provided is a fastener to releasably interconnect the pair.

8 Claims, 2 Drawing Sheets

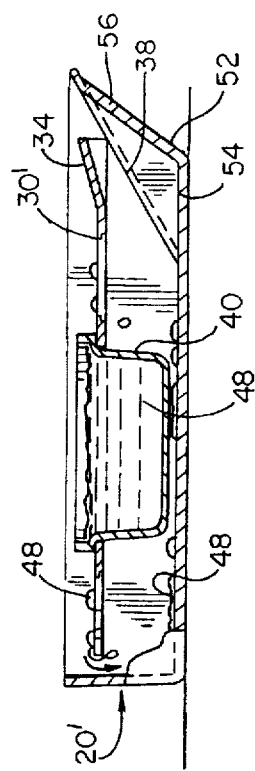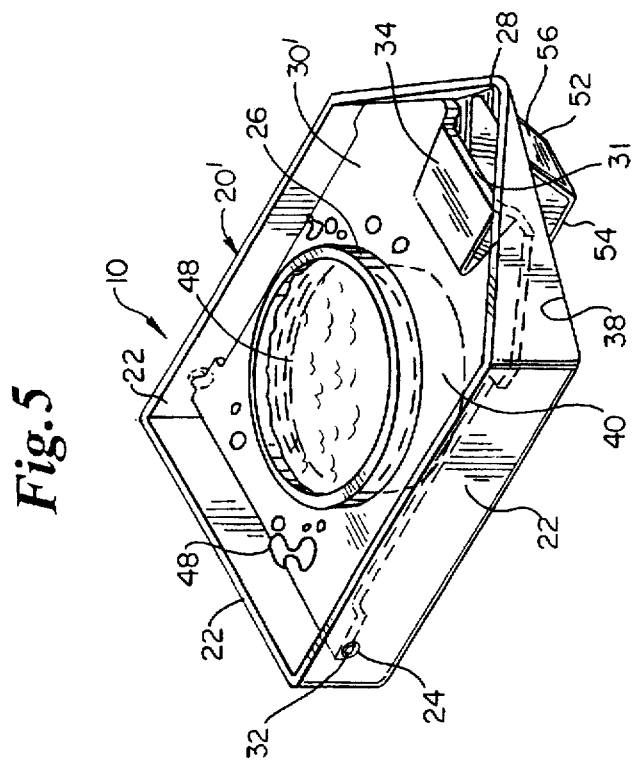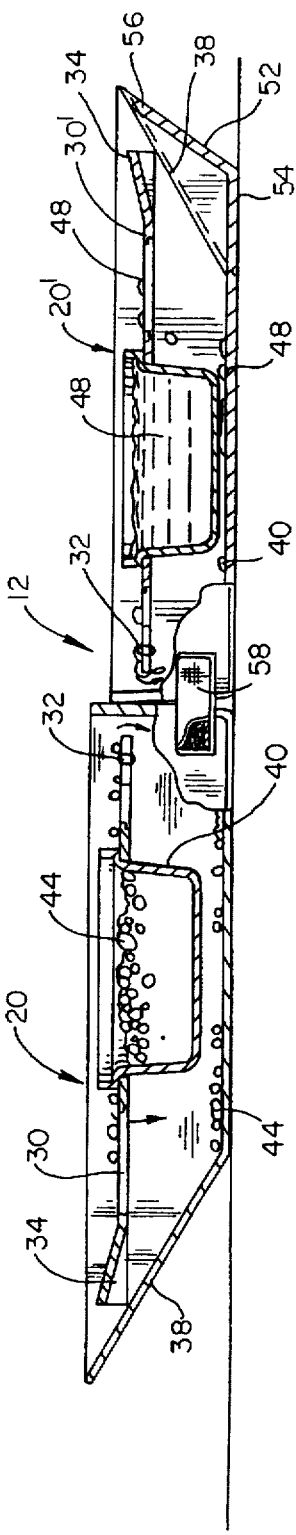

1

PET FEEDING STATION

BACKGROUND

This invention relates generally to pet food feeders and more particularly to a pet feeding station having a detachable pair of trays, one f or holding at least one food dish and another for holding at least one water dish, each tray having a pivoting mount for receiving their respective dish, the pivoting mount pivots vertically to clean the area or to recycle particulate food spillage.

Numerous pet food stations have been provided in prior art that are adapted to include a tray having a dish mounted thereon. One example reference discloses a rimmed tray having a peripheral mounting wall to mount food or water containers to the tray. Another reference relates to a pet food receptacle designed to prevent insect contact with food positioned within the tray. A liquid moat around the food compartment prevents contact of the food by insects.

These patents are all illustrative of such prior art but these devices do not provide any specific manner for collecting spilled liquid and collecting and reusing spilled food. Additionally, these patents do not provide any means for releasably attaching a food station to a water station. While these units may be suitable for the particular purpose to which they address, they would not be as suitable for the purposes of the present invention as heretofore described.

SUMMARY

The present invention is directed to a pet feeding station that satisfies these needs for collecting and recycling spilled particulate food, collecting spilled liquids and to provide a releasably detachable food station and water station. A pet feeding station having features of the present invention comprises a tray having a substantially horizontal mount, with at least one aperture formed therein for receiving a dish, said horizontal mount for receiving spillage from said dish. Each tray further comprises three side walls formed generally perpendicularly to a generally flat bottom surface, the fourth wall bent to a pointed end centrally thereof with the bottom surface rising up to meet the pointed end of the fourth wall. The horizontal mount has a handle formed in one end adjacent the pointed end of the fourth side wall for manually grasping the horizontal mount. The horizontal mount further has a pair of pivots formed in the end opposite the handle end, for manually grasping said tray at said handle and pivoting the horizontal mount to a generally vertical position for retrieval of the spillage from the food dish into the bottom of the tray. The tray is then manually positioned such that spillage is poured out the pointed end of the tray for reuse or disposal.

The pet feeding station further comprises a tray having a horizontal mount with at least one aperture for receiving a dish, the horizontal mount further having a plurality of perforations allowing spilled liquids to flow through the horizontal mount surrounding the dish, the spilled liquids collected by the tray.

The pet food station further comprises a fastener for releasably interconnecting a pair of trays at a rear surface thereof to provide both food and water to the pet.

BRIEF DESCRIPTION OF THE DRAWINGS

Understanding of the invention will be enhanced by referring to the accompanying drawings, in which like numbers refer to like parts in the several views and in which.

2

Figure 1:
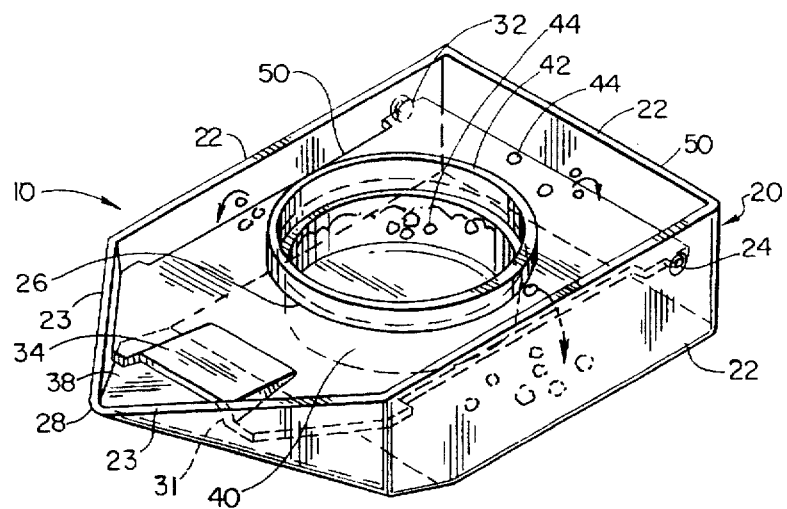
FIG. 1 is a perspective view of a pet feeding station of the invention with a food dish received by a horizontal mount.
Figure 2:
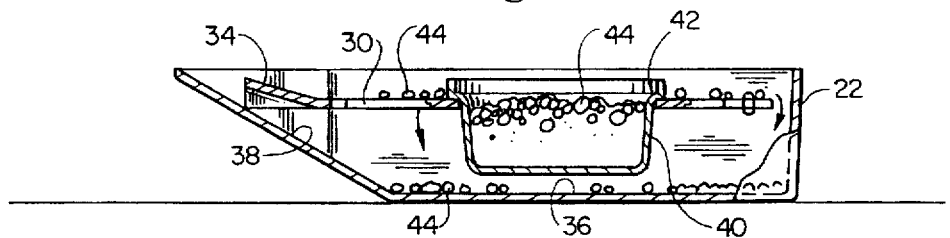
Figure 3:
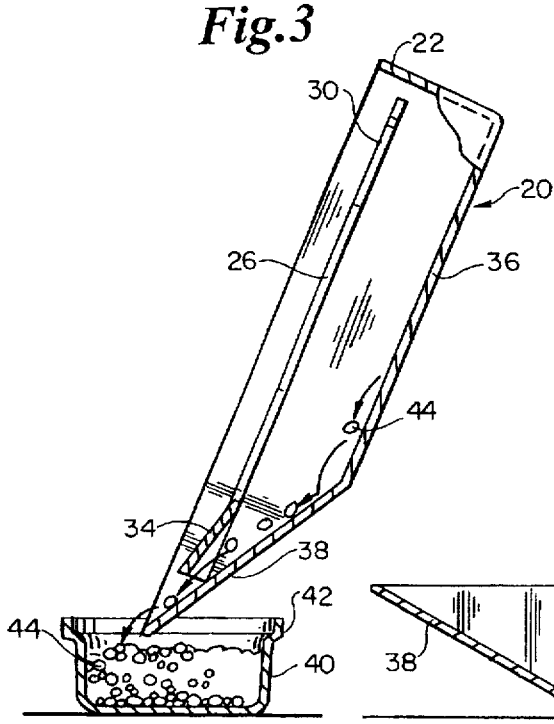
Figure 4:
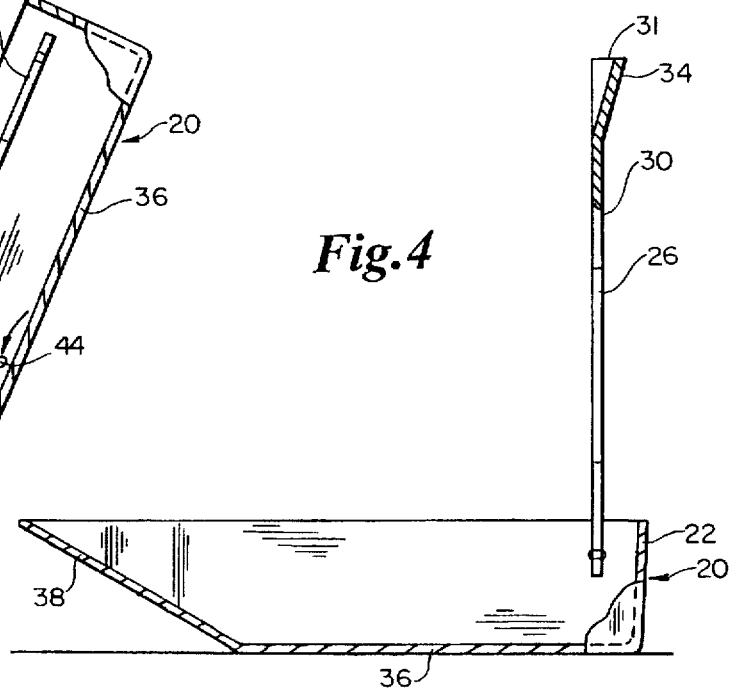

FIG. 2 is a side view of the feeding station of FIG. 1 with parts broken away for better view, with the food dish received by the horizontal mount;

FIG. 3 is a side view with parts broken away for a better view, with the feeding station position such that particulate food could be retrieved for re-use;

FIG. 4 is a side view with parts broken away for better view, with the pivoting mount positioned vertically;

FIG. 5 is a side perspective view of the pet feeding station of the invention with a water dish received by horizontal mount, tray having a optional leg shown beneath pointed end of tray for stability of the tray;

FIG. 6 is a side view of the water dish with the pointed end shown in phantom; and FIG. 7 is a side view of the pair of trays comprising the feeding station of this invention with a fastener shown interconnecting the food tray and water tray.

DETAILED DESCRIPTION OF THE CURRENTLY PREFERRED EMBODIMENTS

Understanding of the invention will be further enhanced by referring to the following illustrative but nonlimiting example.

A pet feeding station comprising a generally rectangular tray with a horizontal mount having a recess to receive and support at least one dish for containing water or particulate pet food. The horizontal mount is provided with openings or perforations which allow spillage from the individual dishes to collect in the tray. In this way, the tray can be kept clear of spillage, while allowing the water to be collected for disposal and the particulate matter to be collected for re-use. A pair of trays, each with a horizontal mount for receiving and supporting a dish to provide food and water to the pet, is preferred and also provided are fastening means to releasably interconnect the pair.

Turning now to the drawings, in which like reference characters refer to corresponding elements throughout the several views, FIG. 1 illustrates the pet feeding station 10 having a first tray 20 with a horizontal mount 30 pivotably attached to opposite sidewalls 22 by pivot 32 received by aperture 24. A recess 26 is formed centrally in horizontal mount 30 for receiving and supporting a lip edge 42 of dish 40.

First tray 20 has a generally square-shaped bottom with three side walls 22 formed perpendicularly to the bottom 36, the side walls 22 meeting at right angles. A pair of apertures 24 are formed in opposite side walls 22. In place of a fourth sidewall are fourth and fifth sidewalls 23 meeting at a generally right angle centrally thereof to form a pointed end 28. The tray bottom 36 rises up from the generally flat plane of tray bottom 36 at an angle approximately 45°, forming a generally triangular shaped platform 38, to meet the pointed end 28 of fourth and fifth sidewalls 23. The front edge 31 of the horizontal mount 30 rests on the platform 38.

Horizontal mount 30 is generally arrow shaped with a pair of pivots 32 formed on opposite sides received by apertures 24 in tray sidewalls 22. A recess 26 is formed generally centrally in horizontal mount 30 for receiving a generally circular shaped dish 40. Lip 42, of a greater diameter than dish 40, is supported by edge of recess 26. Dish 40 may hold either particulate food 44, as indicated in FIGS. 1-3 and 7, or water 48, as indicated at FIGS. 5-7. Horizontal mount 30 is supported at a first end by pivots 32 received by apertures 24 and supported at a second end by platform 38. Formed continuously from the front edge 31 of horizontal mount 30 is a handle 34. Because horizontal mount 30 has spaces 50 at points along its perimeter between mount 30 and sidewalls 22, spilled particulate food 44 may drop through the spaces 50 to tray bottom 36, as shown at FIG. 2. This particulate food 44 may be retrieved by manually inverting the tray 30, as shown at FIG. 3, and letting the particulate food 44 fall out the opening formed by handle 34 which acts as a spout, or dish 40 may be removed and horizontal mount 30 may be pivoted to an out of the way position for cleaning of the inside surface of tray 30, as shown at FIG. 4.

A second tray 20', indicated at FIGS. 5–7, has perforations formed in horizontal mount 30' through which fluid, such as water 46, may flow directly into tray 20' therebelow. Dish 40 is received in a similar manner by recess 26 formed in horizontal mount 30'. A foot 52, having a flat plane edge 54 adjacent the flat portion of bottom 36 and an angled edge 56, attached to a bottom edge of platform 38, provides stability to tray 30', which is an especially important feature when the pet feeding station 10 is used with large pets. Foot 52 prevents tray 20' from flipping over when the pet steps on horizontal mount 30' adjacent the handle 34.

A pair of pet feeding stations 10 may be interconnected by a fastener 58, in actual use conditions Velcro™ has been used but any appropriate fasteners may be used, forming a two piece pet feeding station 12, as shown at FIG. 7. The pet feeding station is made of thermo setting plastic although other hard plastic materials, and ceramics and metals could be used.

In use, the tray 20 is positioned at the point of use, generally on a floor or other surface accessible to the pet, the dish 40 is positioned on the horizontal mount 30 and the particulate food 44 or water 46 may be placed in the dish 40. If spillage of the food 44 or water 46 occurs, the dish 40 is removed from the horizontal mount 30,30', and either the pet feeding station 20,20' is manually inverted emptying the spillage out the spout formed by handle 34 and received by dish for reuse, illustrated at FIG. 3, or the horizontal mount 30,30' is pivoted to an upright position, illustrated at FIG. 4, and the inside edge of tray bottom 36 may be cleaned. A pair of trays 20,20' are provided and interconnected by fastener 58 providing both food 44 and water 46 to the pet.

An advantage to this pet feeding station 10 is that a pair of trays 20,20' may be releasably interconnected for use, FIG. 7, an individual tray 20 or 20' may be used, or the pair may be disconnected for storage or for ease of transporting to a new location. It is an additional advantage of this invention that the horizontal mount 30,30' may be pivoted out of the way for cleaning, and for retrieval of the pet food 44. It is a further advantage that the perforations in horizontal mount 30' allow water 46 to pass immediately through horizontal mount 30' to be retained by tray 20' thereby providing an aesthetically clean environment for the pet and its owner. It is an additional advantage that foot 52 provides stability to the pet feeding station 10.

Although the present invention has been described in considerable detail with reference to certain preferred versions thereof, other versions are possible. For example both horizontal mounts 30,30' could be perforated. A foot could be provided for both trays 20,20'. Other fasteners 58 could be used such as interconnecting plastic, or other material, hooks, or screws, or nuts and bolts. Therefore, the spirit and scope of the appended claims should not be limited to the description of the preferred versions contained herein.

What is claimed is:

1. A pet food station comprising:

at least one tray, having a generally horizontal bottom surface, said tray further comprising three side walls formed generally perpendicularly to the bottom surface, a fourth and fifth wall bent to a pointed end centrally thereof with said bottom rising up to meet the pointed end forming a platform;

a horizontal mount with at least one recess formed therein for receiving a dish, said horizontal mount for receiving spillage from said dish, said horizontal mount supported above said tray by said platform;

said horizontal mount having a handle formed in one end thereof adjacent the pointed end.

2. The pet food station of claim 1, wherein said handle, provided for manually grasping said tray at said handle, is further provided with a pair of pivots formed in said horizontal mount adjacent an end opposite said handle end, for supporting said horizontal mount above said tray and for pivoting said horizontal mount to a generally vertical position for retrieval of spillage from said dish into said bottom of said tray, said tray then manually positioned such that spillage is poured out said pointed end of said tray into a dish for re-use or disposal.

3. The pet feeding station of claim 1, further comprising a pair of trays.

4. The pet food station of claim 3, further comprising a fastener for interconnecting said pair of trays at a rear surface thereof.

5. The pet food station of claim 1, wherein said horizontal mount is perforated for retrieval of fluids therethrough into said tray.

6. A pet feeding station comprising:

a pair of trays, each of said trays having a generally horizontal bottom surface, said tray further comprising three side walls formed generally perpendicularly to the bottom surface, and a fourth and fifth side wall bent to a pointed end centrally thereof with said bottom rising up to meet the pointed end forming a platform;

a horizontal mount positioned above said tray, with at least one recess formed therein for receiving a dish, said horizontal mount for receiving spillage from said dish;

said horizontal mount, supported by said platform, said mount having a handle formed in one end thereof adjacent the pointed end;

said horizontal mount having a pair of pivots formed adjacent the end opposite the handle, for supporting and pivoting said horizontal mount to an out of the way position for cleaning and retrieval of spillage.

7. The pet food station of claim 6, further comprising a fastener for interconnecting said pair of trays at a rear surface thereof.

8. The pet food station of claim 6, wherein said horizontal mount is perforated for retrieval of fluids therethrough into said tray.

* * * * *